July 29, 1924.

F. L. BUTLER 1,502,938

INSULATED COUPLING FOR ELECTRIC FIXTURES

Filed Jan. 19, 1922

INVENTOR
F. L. Butler
BY Munn & Co
ATTORNEYS

Patented July 29, 1924.

1,502,938

UNITED STATES PATENT OFFICE.

FRANK LOWELL BUTLER, OF CHICAGO, ILLINOIS.

INSULATED COUPLING FOR ELECTRIC FIXTURES.

Application filed January 19, 1922. Serial No. 530,397.

*To all whom it may concern:*

Be it known that I, FRANK L. BUTLER, a citizen of the United States, and a resident of Chicago, in the county of Cook and State of Illinois, have invented a new and useful Improvement in Insulated Couplings for Electric Fixtures, of which the following is a full, clear, and exact description.

My invention relates to improvements in insulated couplings for electric fixtures, and it consists in the combinations, constructions, and arrangements herein described and claimed.

An object of my invention is to provide an insulated coupling which is of minimum length.

A further object of my invention is to provide a device of the character described which is substantially as strong as an all metal coupling, since a pin connects the two metal parts of the coupling.

A further object of my invention is to provide a device of the character described in which the insulating portions are not subjected to any strain.

A further object of my invention is to provide an insulated coupling which is adapted to receive a relatively large pipe in comparison with the outer diameter of the coupling.

A further object of my invention is to provide a device of the character described in which the pin connecting the two metal parts of the coupling is insulated from these parts in a novel manner.

A further object of my invention is to provide a device of the character described which is durable for the purpose intended, simple in construction, and which may be easily and quickly assembled.

Other objects and advantages will appear in the following specification, and the novel features of the invention will be particularly pointed out in the appended claim.

My invention is illustrated in the accompanying drawings, forming part of this application, in which—

In carrying out my invention, I provide a coupling which has a body portion 1 and which has an interiorly threaded recess 2 in one end thereof. This recess is adapted to receive a fixed support, such as a gas pipe (not shown). The opposite end of the body portion 1 has an annular recess 3 therein in which is disposed an insulating sleeve 4.

Figure 1:
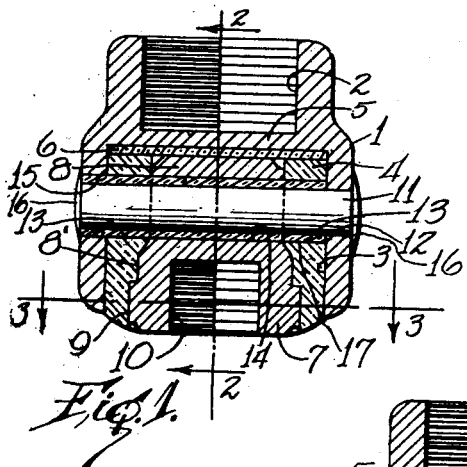
Figure 1 is a vertical section through the device.
Figure 2:
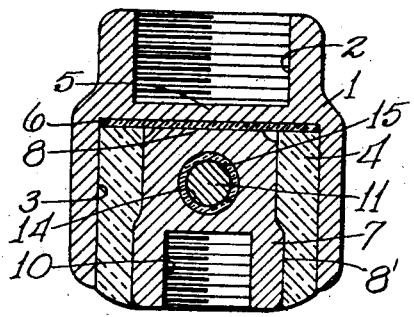
Figure 2 is a section along the line 2—2 of Figure 1.
Figure 3:
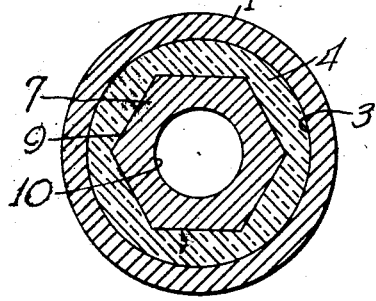
Figure 3 is a section along the line 3—3 of Figure 1.

The top of the sleeve 4 is spaced from the partition 5 of the body portion 1 by means of a fibre disc 6, or the like. A pipe carrying member 7 of the shape shown in Figures 1, 2, and 3, is forced into the insulating sleeve 4 so that the closed end 8 thereof abuts the disc 6. As clearly shown in Figure 1, the lower outer periphery of the member 7 is enlarged at 8' and is fashioned with a hexagonal portion 9. It will be apparent from this construction that the corners of the hexagonal portion will bite into the insulating ring 4 and will prevent rotation of the member 7 with respect to the member 4. The member 7 is provided with an interiorly threaded recess 10 which is adapted to receive the stem of the lighting fixture (not shown).

The ring 4 and the member 7 are securely held in place with respect to the body portion 1 by means of a pin 11. The pin 11 is inserted through alined openings 12, 13, and 14 of the body portion 1, the insulating sleeve 4, and the member 7, respectively. It will be apparent from the drawing that the openings 13 and 14, and one of the openings 12 in the body portion 1, are larger in diameter than the other opening 12 of the body portion. The smaller opening 12 is adapted to snugly receive the pin 11. An insulating sleeve 15, preferably made of fibre, is disposed in the openings 13, 14, and the larger opening 12, and surrounds the pin 11. The ends of the pin 11 are upset, as at 16, so as to securely fasten the pin with respect to the body portion.

From the foregoing description of the various parts of the device, the operation thereof may be readily understood. When assembling the device, the insulating sleeve 4 and the member 7 are first inserted into the recess 3. A hole is then drilled through the body portion 1, the insulating member 4, and the member 7, which is large enough to snugly receive the pin 11. A larger hole, which is alined with the smaller hole, is drilled through one side of the body portion, and through the insulating sleeve 4, and the member 7. The insulating sleeve 15 is then inserted into the larger hole and is moved until the inner edge thereof abuts the wall of the recess 3. The inner diameter of the sleeve 15 is the same as the diameter of the pin 11 and the smaller opening 12. The pin 11 is now inserted into the smaller opening 12 and into the sleeve 15. The opposite ends of the pin 11 are upset; and the device is now ready for use.

From this construction, it will be seen that the pin 11, although carrying the body portion 1 and the member 7, does not act as a conductor between the two parts. The law requires that an air space of at least $\frac{3}{16}$ of an inch be placed between two metal parts that are required to be insulated from each other, and also requires a piece of insulating material of at least $\frac{1}{16}$ of an inch to be placed between two metal parts. It will appear from the construction that the pin 11 conforms with the above law. The lower portion of the sleeve 4 projects slightly below the lower portion of the body 1. The lower portion of the member 7 can therefore be enlarged and still conform with the above law, since there is $\frac{3}{16}$ of an inch between the lower portion of the body 1 and the lower portion of the body 7. If desired, the recess 10 may be enlarged to a greater extent than would be possible if the body portion 7 had the same diameter throughout its length. A pipe of larger diameter may therefore be received in the member 7 than would be possible if the member 7 had the same outer diameter throughout its length. In like manner, it will be apparent that the lower end of the member 8 is enlarged outwardly below the bottom of the sleeve 15. This provides an air space 17 of the required length between the member 7 and the body 1.

Figure 4:
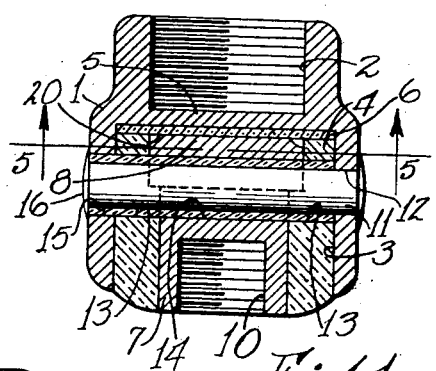
Figure 4 is a vertical section through a modified form of the device.
Figure 5:
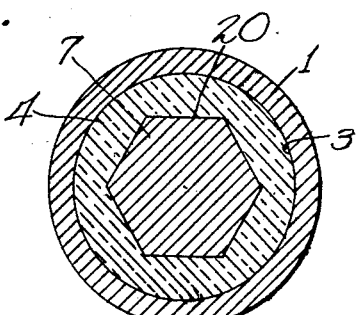
Figure 5 is a section along the line 5—5 of Figure 4.

In Figures 4 and 5, I have shown a slightly modified form of the device which is identical with the form of the device heretofore described except that the member 7 is provided with a hexagonal portion 20 adjacent to the inner end thereof. The member 7, in this form of the device, is first inserted into the sleeve 4 before the sleeve is disposed in the recess 3.

From the foregoing it will be apparent that I have provided a simple coupling which is insulated and which is of a very short length. The coupling is adapted to carry a pipe which is larger in diameter than is possible for insulated couplings of ordinary construction to carry. The device is inexpensive to manufacture and requires the minimum amount of labor in the making thereof.

I claim:

An insulated coupling comprising a body portion having an internally threaded recess in one end thereof and a recess in the other end thereof, said recesses being separated by a partition, an insulating disc disposed adjacent to said partition, an insulating sleeve disposed in the recess having the disc, and being adapted to abut said disc, a pipe supporting member disposed in said sleeve, a pin inserted through said body portion and said member, and an insulating sleeve disposed between said pin and said member.

FRANK LOWELL BUTLER.